(12) United States Patent
Van Helvoirt et al.

(10) Patent No.: US 7,212,474 B2
(45) Date of Patent: May 1, 2007

(54) DETECTING ANOMALIES IN A SCANNING SIGNAL

(75) Inventors: Jan Van Helvoirt, Oss (NL); Hendrik Josephus Goossens, Shanghai (CN); George Alois Leonie Leenknegt, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 270 days.

(21) Appl. No.: 10/524,569

(22) PCT Filed: Jul. 11, 2003

(86) PCT No.: PCT/IB03/03201

§ 371 (c)(1),
(2), (4) Date: Feb. 15, 2005

(87) PCT Pub. No.: WO2004/017321

PCT Pub. Date: Feb. 26, 2004

(65) Prior Publication Data

US 2005/0232096 A1 Oct. 20, 2005

(30) Foreign Application Priority Data

Aug. 19, 2002 (EP) ................................. 02078418
Dec. 13, 2002 (EP) ................................. 02080277

(51) Int. Cl.
*G11B 7/00* (2006.01)

(52) U.S. Cl. ............................... 369/44.32; 369/44.34; 369/53.16

(58) Field of Classification Search ..................... None
See application file for complete search history.

(56) References Cited

U.S. PATENT DOCUMENTS

| 4,785,442 | A | * | 11/1988 | Ohtake et al. | ............ 369/44.26 |
| 5,483,510 | A | * | 1/1996 | Ogino | ..................... 369/44.34 |
| 6,259,663 | B1 | * | 7/2001 | Tateishi | ................... 369/53.12 |
| 2001/0055247 | A1 | * | 12/2001 | Tateishi et al. | .......... 369/44.32 |

FOREIGN PATENT DOCUMENTS

| EP | 0959559 A1 | 3/2000 |
| JP | 62024477 A | 7/1987 |
| WO | WO0017876 | 3/2000 |

* cited by examiner

*Primary Examiner*—Muhammad Edun

(57) ABSTRACT

An apparatus for scanning a track on a record carrier has a head (22) and front end circuitry (31) for scanning the track and generating scanning signals. A detection unit (32) detects anomalies in the scanning signal, for example for adjusting a tracking servo. The detection unit (32) calculates a mean value of the scanning signal and compares the mean value to a threshold for providing an anomaly detection signal (33). Further a classification unit (34) provides an indication of the type of defect for determining a suitable responsive or corrective action.

12 Claims, 9 Drawing Sheets

Figure 3:
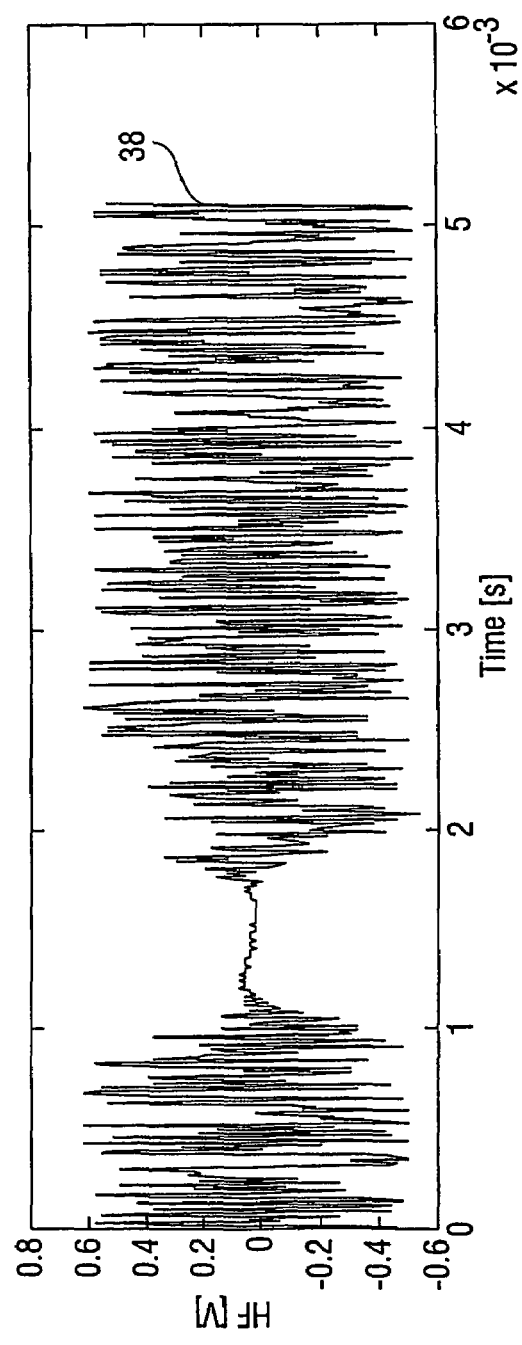
Figure 3:
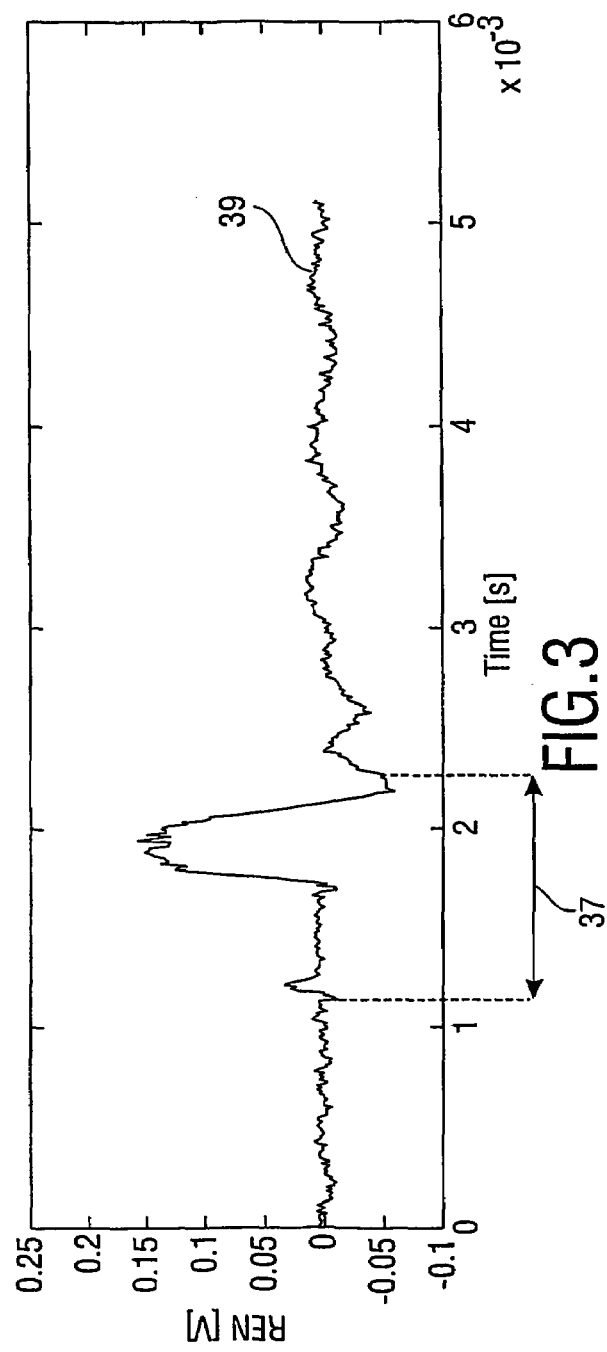

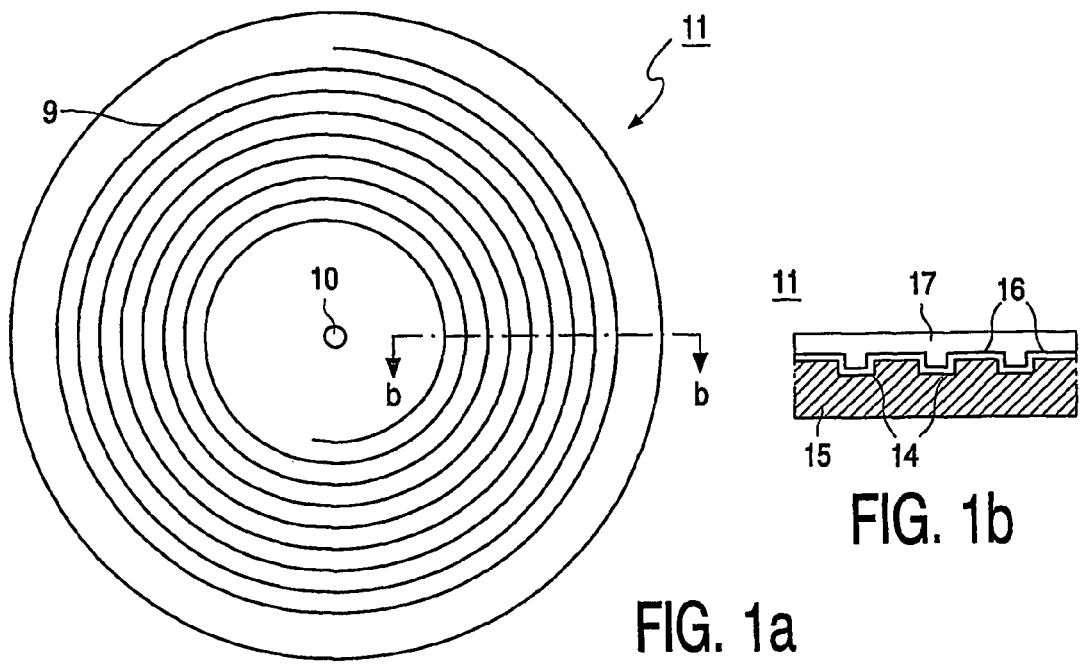
FIG. 1a
FIG. 1b
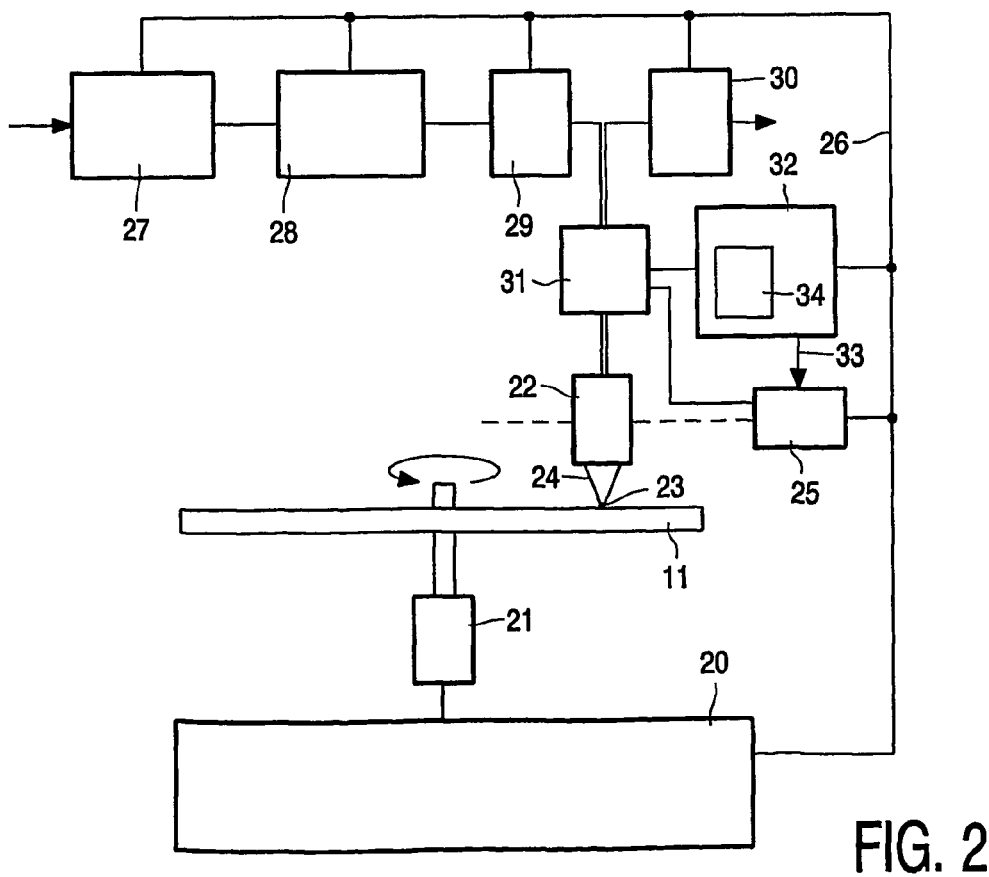
FIG. 2

DETECTING ANOMALIES IN A SCANNING SIGNAL

The invention relates to a device for scanning a track on a record carrier.

The invention further relates to a method of scanning a track on a record carrier.

In data storage and retrieval systems servo loops are applied for controlling the position of a head with respect to the track on the record carrier. Scanning signals are derived from detectors in the optical pickup system and based thereon servo control signals are generated to drive actuators for positioning the head or elements thereof. However large disturbances of the servo signals may be generated by contamination or damage of the surface of the record carrier. For preventing such disturbances anomalies in the scanning signals are to be detected.

A device for scanning a track and reading information is known from patent application WO 00/17876. The device generates a read signal. The document describes detecting disturbances in the read signal by determining an upper and a lower envelope signal value in a predetermined time interval. During the following time interval a difference value is computed by subtracting from each other the values of the lower from the upper envelope signals. A disturbance is detected in the event that the difference value is smaller than a predetermined border value. A problem of the known method for detecting disturbances is that the detection is based on the amount of HF modulation of the read signal due to marks in the track, which HF modulation varies substantially due to a multitude of effects. For example the calculation of upper and lower envelope signals may be unreliable because noise spikes will immediately influence the calculated values.

Therefore it is an object of the invention to provide a device and method for more reliably detecting disturbances in signals from the head.

To this end, according to the invention, a device for scanning a track on a record carrier is provided, which device comprises a head for scanning the track, a front-end unit coupled to the head for generating at least one scanning signal, and a detection unit for detecting anomalies in the scanning signal, the detection unit being arranged for calculating a mean value of the scanning signal and comparing the mean value to a threshold for providing an anomaly detection signal. The effect of comparing the mean value to a threshold is that a deviation of the mean value from its expected value is detected. The threshold may for example be based on a long term average of the mean value plus or minus a detection level.

The invention is also based on the following recognition. The prior art system provides detection of anomalies on the data signal by monitoring the amplitude of the BF modulation signal components caused by marks in the track. Surprisingly the inventors have found that the mean value provides a very good and early indicator of anomalies for scanning signals, in particular scanning signals from optical discs like CD or DVD. The mean value of the scanning signals starts to deviate at the beginning of a damaged or contaminated area on the disc, even before a significant change in the BF modulation can be detected. This has the advantage that in a very early stage the servo control loop can be manipulated, e.g. by temporarily interrupting the input of the servo error signals. It is to be noted that detecting the anomaly a few μsec earlier is relevant for adjusting commonly used servo loops. Early adjustment prevents generating large actuator drive signals which would normally result from the differentiating elements in such servo control loops.

In an embodiment of the device the detection unit is arranged for calculating said mean value for a predetermined interval, in particular by summing a predetermined number of samples of the scanning signal. Using a predetermined interval has the advantage that the mean value can be easily calculated at the arrival of a new signal value, and the mean value will respond quickly to a change in the signal. In particular simply summing the signal values of a number of consecutive samples provides a computationally easy way of generating a value indicative of the mean.

In an embodiment of the device the front-end unit comprises means for generating as the scanning signal a mirror signal indicative of the amount of radiation from a radiation beam reflected via the track, in particular by combining signals from a multitude of detector segments. This has the advantage that the mean value of the mirror signal, which preferably includes signals from every detector available, reliably indicates a damaged or contaminated area on the record carrier.

An embodiment of the device comprises a servo unit for controlling the position of the head or scanning elements of the head in dependence of the scanning signal, and for adjusting said controlling in dependence of the anomaly detection signal, in particular for interrupting the scanning signal during an anomaly. This has the advantage that, in the event of a damaged or contaminated area on the disc, the disturbance of the servo function is reduced.

In an embodiment of the device the detection unit comprises classification means for generating a classification result of a detected anomaly by identifying the detected anomaly among a plurality of predetermined anomaly classes by comparing the scanning signal with a plurality of reference signals corresponding to said plurality of predetermined anomaly classes. In an embodiment of the device the classification means are arranged for determining at least one characteristic value of the scanning signal during the anomaly and comparing the at least one characteristic value to corresponding characteristic values of a set of predetermined anomaly classes. The measures have the advantage that different classification results can be used for different responsive actions, for example the servo system may be adjusted differently, or a specific error message may be displayed for the user, e.g. 'please clean disc'.

In an embodiment of the device the classification means are arranged for determining as characteristic values at least one of the following: a mean value, a duration, a peak value, a distribution of sample values of the scanning signal in a predetermined number of amplitude bands. Calculating said distribution proves to be an easily computable way of determining characteristic features of a signal shape.

In an embodiment of the device the classification means are arranged for generating the classification result at a classification time substantially after the anomaly detection signal indicates an anomaly. This has the advantage that detection can be optimized for early warning and classification can be optimized for reliably indicating the type of disturbance at a later instant.

Further preferred embodiments of the device according to the invention are given in the further claims.

Figure 4:
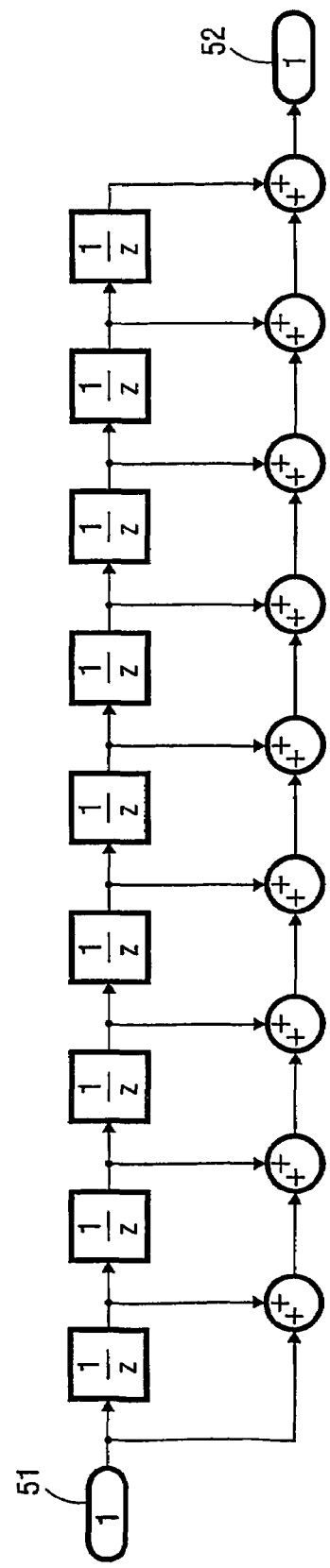
Figure 5:
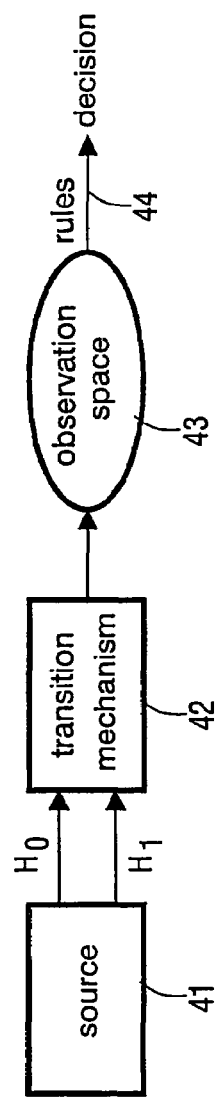
Figure 6:
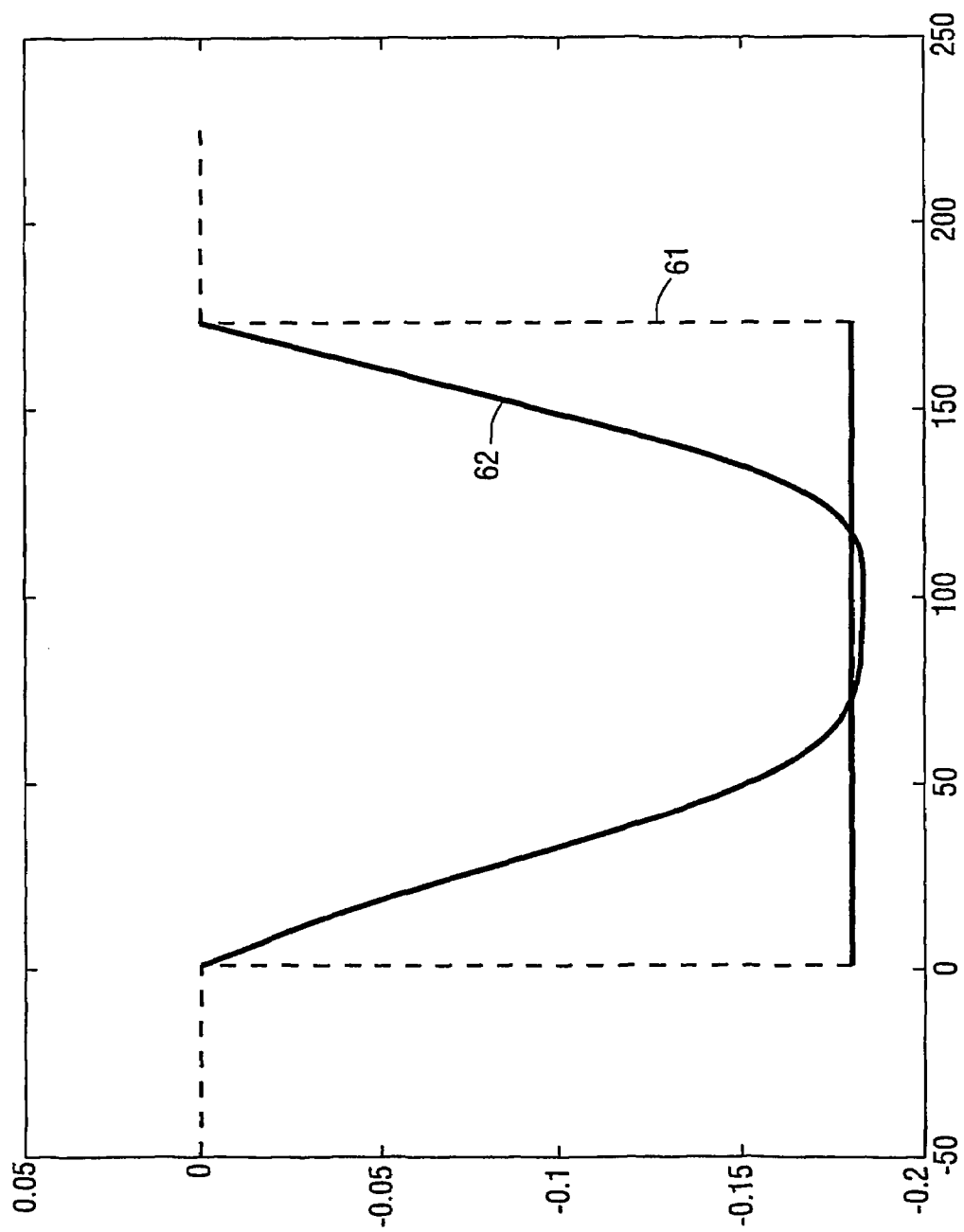
Figure 7:
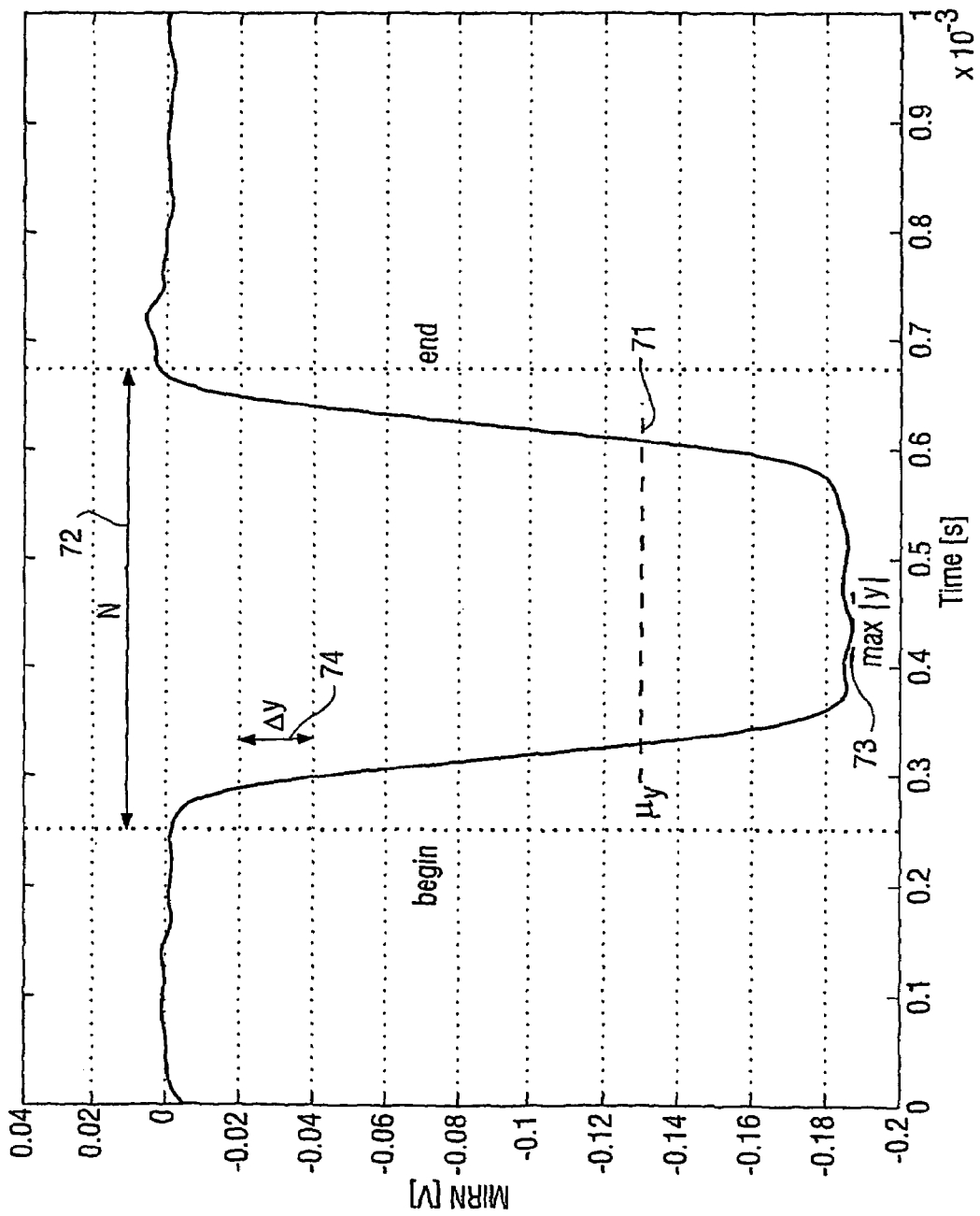
Figure 8:
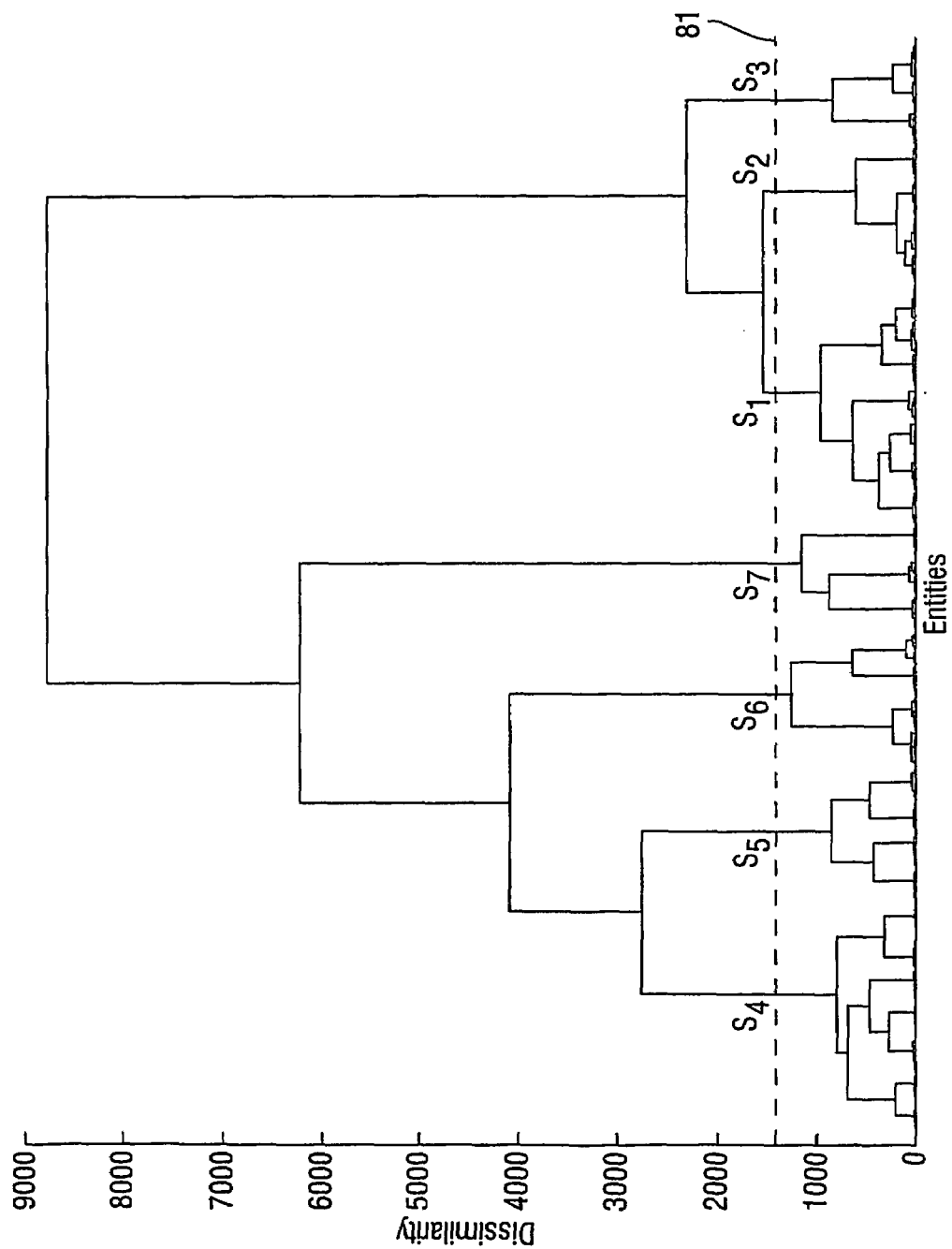
Figure 9:
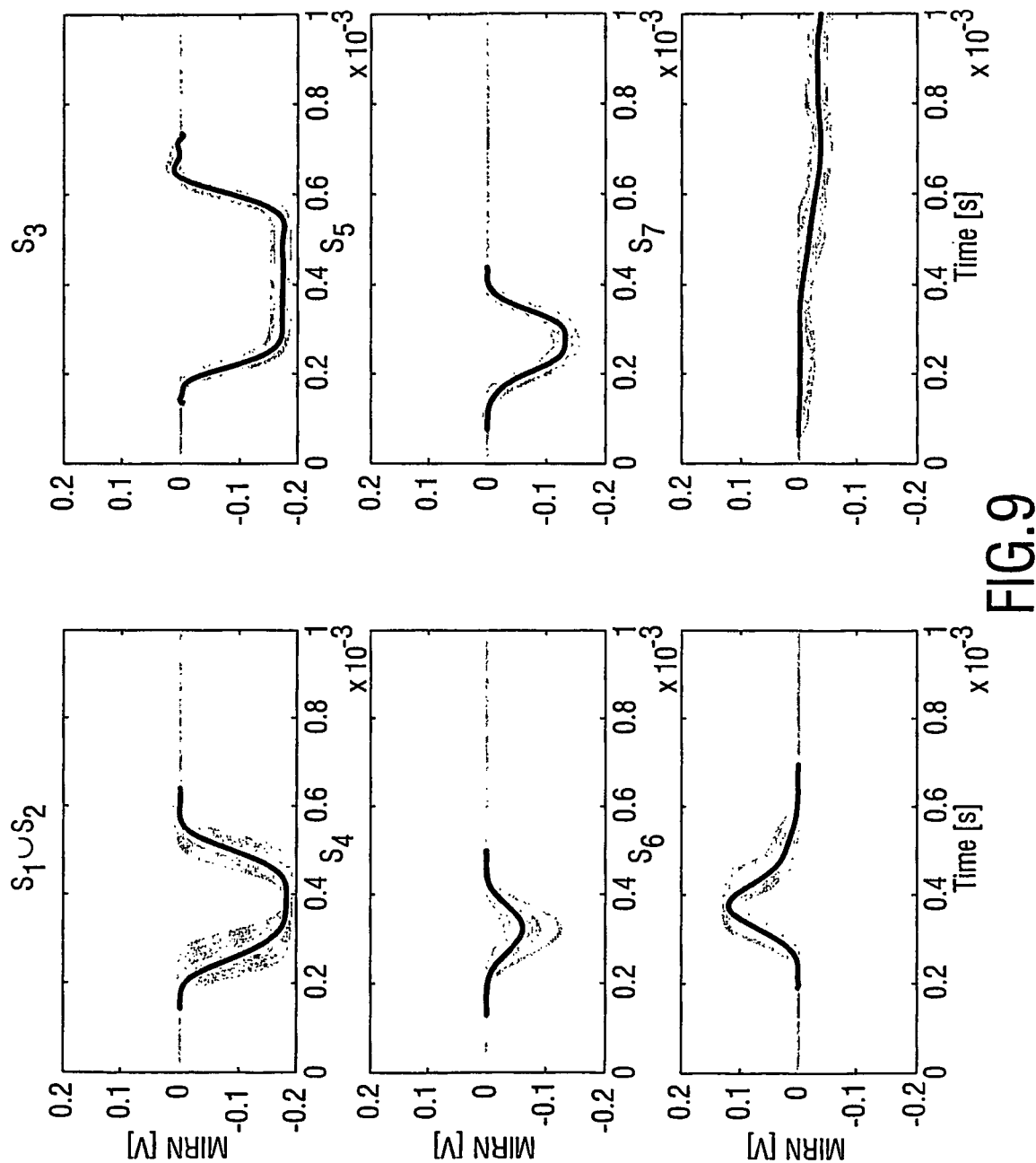
Figure 10:
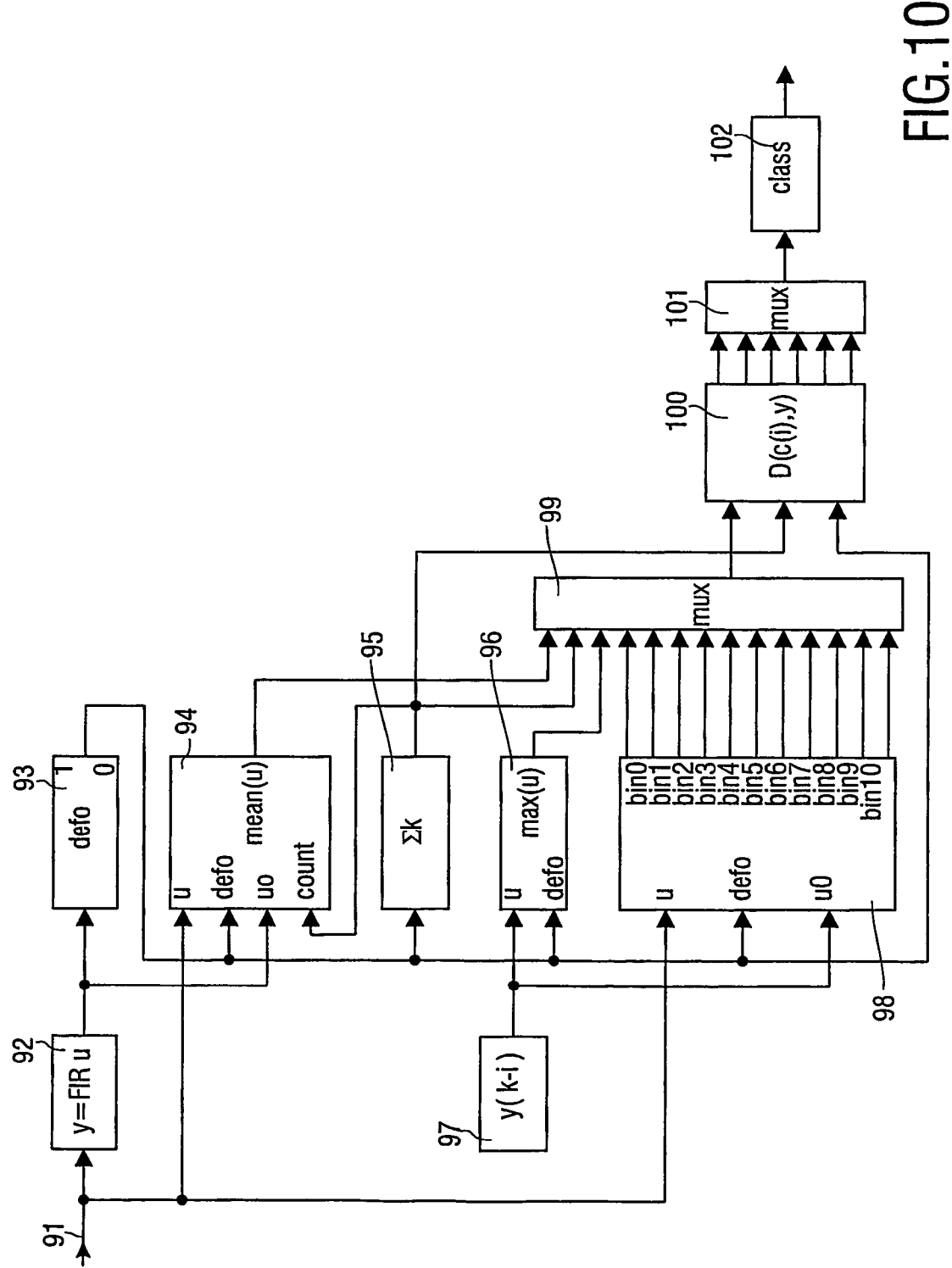
Figure 11:
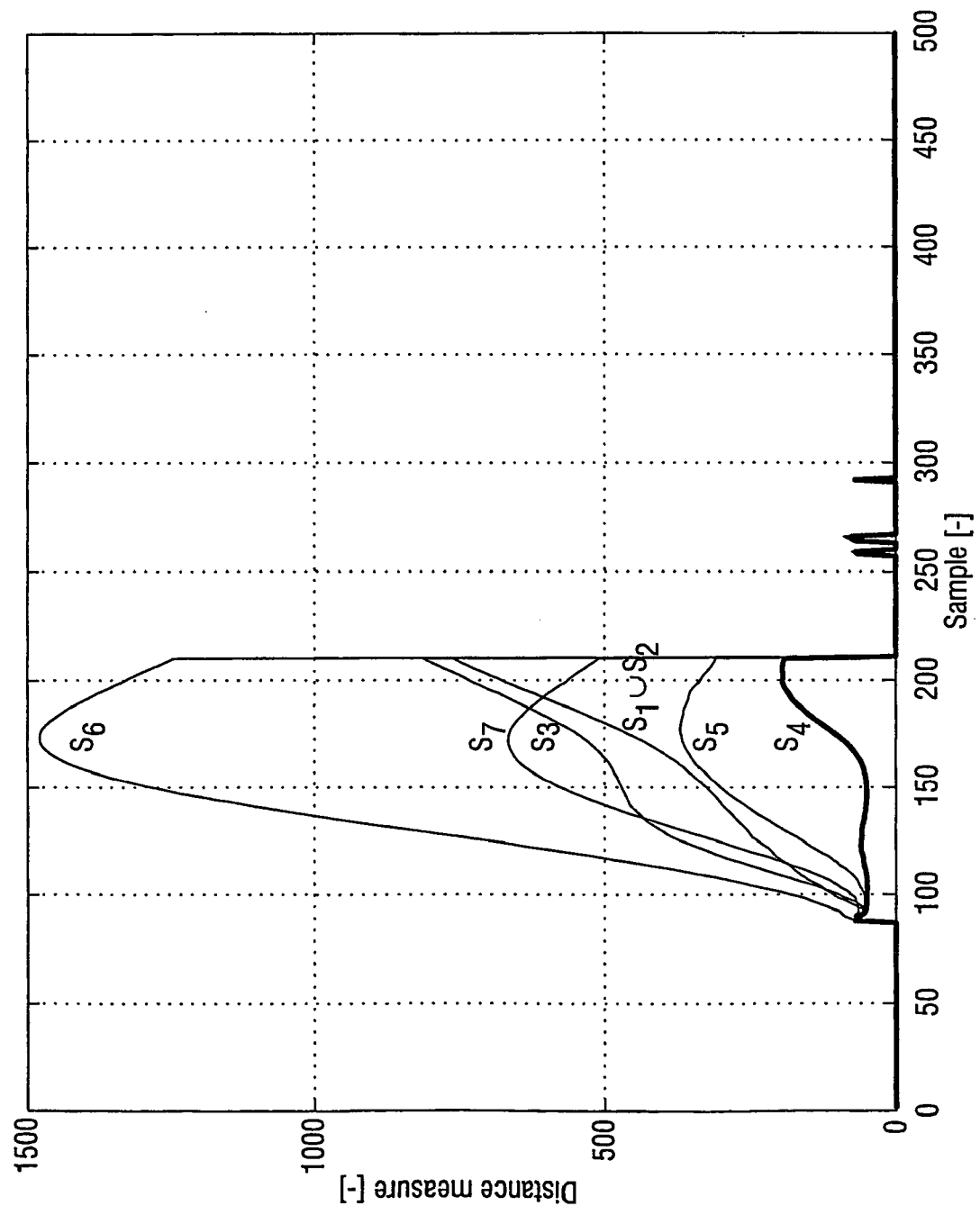

These and other aspects of the invention will be apparent from and elucidated further with reference to the embodiments described by way of example in the following description and with reference to the accompanying drawings, in which FIG. 1a shows a record carrier (top view), FIG. 1b shows a record carrier (cross section), FIG. 2 shows a scanning device having anomaly detection, FIG. 3 shows two scanning signals, FIG. 4 shows a detector model, FIG. 5 shows a FIR filter for calculating a mean value, FIG. 6 shows a defect model, FIG. 7 shows properties of a defect signal used for signal mapping, FIG. 8 shows a dendrogram, obtained with the agglomerative, hierarchical algorithm, FIG. 9 shows the data signal contained in each cluster together with the determined class models, FIG. 10 shows a defect detect and classification unit, and FIG. 11 shows a classification process.

In the Figures, elements which correspond to elements already described have the same reference numerals.

FIG. 1a shows a disc-shaped record carrier 11 having a track 9 and a central hole 10. The track 9, being the position of the series of (to be) recorded marks representing information, is arranged in accordance with a spiral pattern of turns constituting substantially parallel tracks on an information layer. The record carrier may be optically readable, called an optical disc, and has an information layer of a recordable type. Examples of a recordable disc are the CD-R and CD-RW, and writable versions of DVD, such as DVD+RW, and the high density writable optical disc using blue lasers, called Blue-ray Disc (BD). Further details about the DVD disc can be found in reference: ECMA-267: 120 mm DVD—Read-Only Disc-(1997). The information is represented on the information layer by providing optically detectable marks along the track, e.g. pits or crystalline or amorphous marks in phase change material. The track 9 on the recordable type of record carrier is indicated by a pre-embossed track structure provided during manufacture of the blank record carrier. The track structure is constituted, for example, by a pregroove 14 which enables a read/write head to follow the track during scanning. The track structure comprises position information, e.g. addresses.

FIG. 1b is a cross-section taken along the line b—b of the record carrier 11 of the recordable type, in which a transparent substrate 15 is provided with a recording layer 16 and a protective layer 17. The protective layer 17 may comprise a further substrate layer, for example as in DVD where the recording layer is at a 0.6 mm substrate and a further substrate of 0.6 mm is bonded to the back side thereof. The pregroove 14 may be implemented as an indentation or an elevation of the substrate 15 material, or as a material property deviating from its surroundings.

FIG. 2 shows a scanning device having anomaly detection. The device is provided with means for scanning a track on a record carrier 11 which means include a drive unit 21 for rotating the record carrier 11, a head 22, a servo unit 25 for positioning the head 22 opposite the track, and a control unit 20. The head 22 comprises an optical system of a known type for generating a radiation beam 24 guided through optical elements focused to a radiation spot 23 on a track of the information layer of the record carrier. The radiation beam 24 is generated by a radiation source, e.g. a laser diode. The head further comprises (not shown) a focusing actuator for moving the focus of the radiation beam 24 along the optical axis of said beam and a tracking actuator for fine positioning of the spot 23 in a radial direction on the center of the track. The tracking actuator may comprise coils for radially moving an optical element or may alternatively be arranged for changing the angle of a reflecting element. The focusing and tracking actuators are driven by actuator signals from the servo unit 25. For reading the radiation reflected by the information layer is detected by a detector of a usual type, e.g. a four-quadrant diode, in the head 22 for generating detector signals coupled to a front-end unit 31 for generating various scanning signals, including a read signal, a tracking error signal and a focusing error signal. The error signals are coupled to the servo unit (25) for controlling said tracking and focusing actuators. The read signal is processed by read processing unit 30 of a usual type including a demodulator, deformatter and output unit to retrieve the information.

The control unit 20 controls the scanning and retrieving of information and may be arranged for receiving commands from a user or from a host computer. The control unit 20 is connected via control lines 26, e.g. a system bus, to the other units in the device. The control unit 20 comprises control circuitry, for example a microprocessor, a program memory and interfaces for performing the procedures and functions as described below. The control unit 20 may also be implemented as a state machine in logic circuits. In an embodiment the control unit performs the functions of detecting and/or classifying anomalies as described below.

The device comprises a detection unit 32 for detecting anomalies in the scanning signal as follows. An anomaly detection signal 33 is generated in the event that an anomaly is detected. For detecting a mean value of the scanning signal is calculated. The mean value can be a sliding average of the signal values. The mean value is compared to a threshold as described below, for example a long term mean value. If the difference of the threshold and the calculated mean value of the signal exceeds a predetermined detection level the anomaly signal is set to an active state. In an embodiment the detection unit 32 calculates the mean value for a predetermined interval. The interval is selected to be longer then common periodic signal components, e.g. the longest mark in the track. In an embodiment a value indicative of the mean is calculated by summing a predetermined number of samples of the scanning signal. It is noted that the DC component in such a mean value signal is to be taken into account when setting the threshold.

In an embodiment the front-end unit 31 has a combination circuit that adds signals from several detectors for generating as the scanning signal a mirror signal MIRN indicative of the amount of radiation from a radiation beam reflected via the track. In an embodiment the combination circuit combines signals from every available detector segment.

In an embodiment the servo unit 25 has a unit for adjusting the servo control function when the anomaly detection signal 33 is activated. The adjustment is acting on the actuator signals, for example maintaining the actual values until the end of the anomaly. In an embodiment the error signals derived from the scanning signal are interrupted, i.e. made zero, during an anomaly. Alternatively the servo control unit has a unit for providing actuator signals based on extrapolating the error signals up to the anomaly. In an embodiment the servo unit 25 the unit for adjusting has an input for a classification result as described below. The type of adjustment is selected based on the classification, for example resuming the normal servo operation during an anomaly of a less disturbing type.

In an embodiment of the detection unit comprises a classification unit 34 for generating a classification result of a detected anomaly. The anomaly is classified to be of a certain type corresponding to one of a number of classes. The classification result is generated at a classification time after the anomaly detection signal indicates an anomaly. Hence a period of time is available for processing. It has been observed that, at least for optical disc scanning signals, directly detecting specific types of disturbance, e.g. by a maximum likelihood estimator, is significantly slower than first detecting the anomaly by a mean value deviation, and subsequently classifying the anomaly.

First a number of characteristic values are determined of the scanning signal during the anomaly, for example a mean value, a duration, a peak value, a distribution of sample values of the scanning signal in a predetermined number of amplitude bands. Then the determined characteristic values are comparedto corresponding characteristic values of a set of the predetermined anomaly classes, e.g. by calculating a distance in a multidimensional space. In an embodiment the classification result is generated as soon as said comparison for one of the anomaly classes indicates a difference that is smaller than the difference values for the remaining anomaly classes by at least a predefined threshold.

In an embodiment the device is provided with means for recording information on a record carrier of a type, which is writable or re-writable, for example CD-R or CD-RW, or DVD+RW or BD. The device comprises write processing means for processing the input information to generate a write signal to drive the head 22, which means comprise an input unit 27, and modulator means comprising a formatter 28 and a modulator 29. For writing information the radiation is controlled to create optically detectable marks in the recording layer. The marks may be in any optically readable form, e.g. in the form of areas with a reflection coefficient different from their surroundings, obtained when recording in materials such as dye, alloy or phase change material, or in the form of areas with a direction of magnetization different from their surroundings, obtained when recording in magneto-optical material.

Writing and reading of information for recording on optical disks and formatting, error correcting and channel coding rules are well-known in the art, e.g. from the CD or DVD system. In an embodiment the input unit 27 comprises compression means for input signals such as analog audio and/or video, or digital uncompressed audio/video. Suitable compression means are described for video in the MPEG standards, MPEG-1 is defined in ISO/IEC 11172 and MPEG-2 is defined in ISO/IEC 13818. The input signal may alternatively be already encoded according to such standards.

In an embodiment of the writing device the front-end unit 31 and the detection unit 32 include a switch for setting a different signal as the scanning signal and/or a different threshold for comparing the mean value in the event that the device is in writing mode.

Further embodiments of the detection and classification function are described below with reference to FIG. 3 to 11.

FIG. 3 shows two scanning signals. The upper trace 38 is a high frequency signal and the lower trace 39 is a radial error signal, influenced by a disc defect in the area indicated by arrow 37. It is noted that one particular group of disturbances can be identified for an optical disc drive that has to do with the quality of the optical disc. This quality can severely deteriorate due to incorrect or incautious handling of the discs by the user or the quality is bad from the start when the discs are poorly produced. One can think of scratches, dirt spots and fingerprints that arise on the polycarbonate substrate or the anomalies and impurities that are included in the substrate layer. These disc related phenomena are called disc defects, which defects are locally present on a disc and will distort the reflection of the laser beam. Hence they result in abnormal photoelectric signals that in turn will affect the generation of HF and servo signals and the behavior of all drive elements relying on these signals. The HF signal is further influenced by the geometry of the impressed pits and the sequence in which they appear on the disc. Anomalies in this pit/land structure are of a different origin and hence they will be excluded from the group of disturbances called disc defects. The following definition of the term disc defect will be used: disc defects are those features locally present on or in an optical disc that result in different behavior of track signals than what can be expected from the geometry of the information track and the dimensions or shape of the disc. Note that phenomena such as eccentricity, tilt and skew are excluded by this definition. Disc defects are subdivided in classes based on standardized defects, such as black dots, fingerprints and scratches.

An optical disc drive is equipped with several servo controllers that assure the correct positioning of the laser spot on the information track. For accurate tracking the controller has to respond strongly to large position errors, which can be achieved by using a high bandwidth controller. Disc defects also result in, sometimes large, position errors. Since these errors are unreliable, ideally the controller should not respond to them at all, which implies a low bandwidth controller. Even the use of more sophisticated controllers cannot improve playability with respect to disc defects enough without sacrificing tracking performance. This is simply due to the fact that as soon as a disc defect occurs, the photoelectric track signals become severely distorted. Possible scanning signals are the various servo signals such as the normalized radial error and focus error (REN and FEN respectively), the normalized mirror signal (MIRN) that is a measure for the total amount of laser light received by the photodetector, the normalized tilt signal and the BF data signals. From experiments it became clear that both the MIRN and BF signal behavior show the most direct relation with incoming disc defects. The HF signal contains a high frequency component that carries the digital data. This component can be regarded as noise when investigating disc defect influences that occur in a lower frequency range. Next to the MIRN signal it is useful to monitor the behavior of the REN and FEN signals since these signals are directly involved in the positioning of the laser spot. It is clear that the REN and FEN signals are not reliable during the occurrence of a disc defect. The fact that the laser spot position is adjusted by a closed-loop control system increases this uncertainty. Hence care must be taken when analyzing these signals, but they can be used for detecting the start of a disc defect. The success of adjusting the servo control depends on the ability to detect specific disturbances in time to take the required countermeasures. When information on the type of defect is available it further becomes possible to select the most suitable strategy. Hence detection and, closely related, identification of disc defects are discussed below.

Detection of disc defects is basically testing two hypothesis, i.e. given a signal record $(y_1, y_2, \ldots, y_k)$ decide which of the two hypotheses $H_0$ (no defect) or $H_1$ (defect) is true. Online detection implies a causal system. This implies that it is impossible to detect an anomaly precisely at the moment that it occurs. Some delay $\Delta t$ is inherently present between the detection at $t=t_s+\Delta t$ and the actual occurrence at $t=t_s$ of the anomaly. The goal of a detection system now is to detect a change as quickly as possible after it has occurred, in order that, at each time instant, at most one change has to be detected between the previous detection and the current time point k. It is noted that the detection problem may further include classification or identification. In both cases the behavior of a dynamic system, represented by a signal, is compared with known types of behavior. Based on this comparison a decision is made according to predefined rules. For detection the decision is whether there is an anomaly present or not while in the case of classification or identification we decide to which class the behavior (signal) belongs as explained below. Decoupling of the detection and identification of disc defects implies one algorithm that is able to detect all different types of disc defects. This relaxes the need for fast defect identification and hence identifications accuracy can be improved. However the chance of false alarms during the defect detection increases. Since the detector must be able to detect all defects its resolution will be reduced. This makes it harder to distinguish disc defects from other signal distortions. However when the countermeasures initiated by defect detection do not endanger the proper functioning of the drive in case of a false alarm, the decreased reliability of the detector becomes of less importance.

FIG. 4 shows a detector model. A transition mechanism 42 maps the hypotheses for a given source 41 into an observation space 43. This mapping follows from the criteria to which the detection must comply. The selection of the valid hypothesis is done by applying a decision rule 44 to the mapping result. The detection method discussed here uses the MIRN signal as input. The task of the detector will be to detect whether the influence of a defect, represented by a reference signal $y_c(k)$, is present in the input. First two corresponding hypotheses $H_0$ and $H_1$ for the disc defect detection problem are defined. The null hypothesis $H_0$ states that no disc defect is present and $H_1$ is true when a disc defect is present. The observations of the MIRN signal under the two hypotheses are:

$H_0: y(ts+k)=y_n(ts+k)$ $H_1: y(ts+k)=y_n(ts+k)+y_c(k)$ with $k=1, 2, \ldots, N$ determining the detection window $y(t_s)=(y(t_s+1), y(t_s+2), \ldots, y(t_s+N))$. The signal $y_c(k)$ denotes the reference signal and $t_s$ is the defect arrival time. The observations of the MIRN signal and the defect signal are jointly called source 41. Attached to the two hypotheses are the two conditional probability densities $P_{y(t_s)|H_0}(y|H_0)$ and $P_{y(t_s)|H_1}(y|H_1)$. They define the chance on respectively $H_0$ and $H_1$, given the actual observations of $y_s$. In order to determine which of the two hypotheses is true a decision rule is needed. The requirement for such a rule is that it maximizes the reliability of the decision for a given detection time. Stated differently it must minimize the detection time for a given level of reliability. It is assumed that the chance of a false alarm and that of a missed detection are directly related to the detection time or, with a given sample time, the size of the detection window. In that situation the likelihood ratio test yields an optimal decision rule with respect to those criteria. It is defined as:

$$\frac{P_{y(t_s)|H_1}(y|H_1)}{P_{y(t_s)|H_0}(y|H_0)} >^{H_1} \leq^{H_0} \eta$$

where $H_1$ is accepted when the ratio in the left-hand side is greater than the threshold $\eta$. Else $H_1$ is rejected, indicating that no defect is detected. The likelihood ratio forms the probabilistic transition mechanism 42 while the threshold comparison is the decision rule 44 in FIG. 4. For simplicity it is assumed that the normal, unaffected MIRN signal is an uncorrelated, zero-mean stochastic process (Gaussian white noise) with variance $\lambda$. In that case the likelihood ratio test for the presence of a disc defect is:

$$\sum_{k=1}^{N} y(t_s+k)y_c(k) >^{H_1} \leq^{H_0} \frac{1}{2}\sum_{k=1}^{N} y_c^2(k) + \lambda \cdot \ln\eta$$

which can be written in the form of a simple discrete time FIR-filter. The detector then becomes:

$$\sum_{k=0}^{N} Y_c(N-k)(z^{-k} \cdot Y(z)) >^{H_1} \leq^{H_0} TH$$

where TH denotes a new threshold value. The assumption that the unaffected EN signal can be described by Gaussian white noise is not a very realistic one. A more realistic representation can be obtained by incorporating the coloring of the noise for the quasi-stationary MIRN signal. The choice of the threshold value TH and the detection window size N depend on the requirements of detection speed and reliability. These requirements on their turn depend on other elements of the optical disc drive such as the used control strategy during disc defects, the data decoding and error correction algorithms.

FIG. 5 shows a FIR filter for calculating a mean value. Signal samples are supplied to an input 51. A suitable number of sections delay the samples and add the samples to the previous result to arrive at an output mean value 52 to be compared to a threshold as given in the last formula above. The FIR-filter forms the core of the maximum likelihood detector. Basically the output of the filter is a multiplication of N samples of the input signal with N corresponding samples of the assumed defect reference signal. It is observed that the slope of the reference signal yc(k) in the detection window is the feature that determines the amplitude of the FIR-filter response.

FIG. 6 shows a defect model. A curve 62 indicates a reference signal based on detected defects. The defect is modeled with a reference signal 61 that has an infinitely steep slope. As explained above with FIG. 5 the 'block form' reference signal 61 provides a model for reliable detection. The amplitude of this 'block form' defect model can be chosen at will, as long as the corresponding threshold value is adjusted accordingly. Note that when the amplitude of the block form defect signal is chosen equal to one, the output of the FIR-filter is reduced to a simple summation of N samples of the incoming MIRN signal.

Timely knowledge of the type of disc defect that is influencing the optical disc drive makes it possible to select or adjust control strategies and other countermeasures to eliminate influences of disc defects on the system. Since parametric models of signals affected by disc defects are not available, estimation methods like for instance a Kalman filter, cannot be used to identify disc defects. Identification of disc defects by comparing new signals with a database of known defect signals resolves this problem as long as the database contains enough measurements. Given the enormous number of possible disc defects the feasibility of this method is limited by the available memory for the database and the speed of algorithms to search through the stored data. The size of a database with reference signals can be reduced by identifying a limited number of classes that each describe a large group of defect signals in the whole data set.

After a defect is detected a separate algorithm is needed to classify the occurring defect as stated before. This classification is performed by comparing a defect signal with a set of reference signals, each describing a class of disc defects. A suitable choice for making this comparison is the MIRN signal. As soon as the defect filter detects a defect, a property vector p for the incoming MIRN signal is constructed. This vector contains estimates for the mean value, duration, absolute peak value and the number of samples in several predetermined amplitude bands. At the detection time instant only N samples of the signal are available but for each new sample extra information becomes available and hence the estimates of the various properties become more accurate. For the reference signals the property matrices or look-up tables, denoted by Pc, can be determined off line. Each row n, n=1, 2, 3, . . . of such a matrix holds the property vector for the first N+n−1 samples of the corresponding reference signal. At each time instant k distances can be calculated, for example the Euclidean distance, between the property vector p of the input signal and the property vectors of all the class reference signals. When the number of available samples is sufficiently high, one of these distances will become significantly smaller, indicating a strong similarity between the corresponding reference signal and the incoming defect signal. Recognizing this similarity identifies the occurring disc defect on-line at an early stage during the defect, i.e. before the end of the defect.

It is noted that for the detection and classification algorithms offset cancellation of the MIRN signal is required. The offset can be determined by calculating the average value of the MIRN signal when it is unaffected by any disturbances. The required offset value can be calculated from a fixed number of unaffected samples and it can be updated repetitively. Furthermore a good initial offset value must be available that, for instance, is determined during the drive's initialization sequence.

In an embodiment of a writing device a detector must be adapted to the laser power adjustment. When an optical disc drive switches from write mode to read mode or vice versa, the laser is switched between high and low power. This adjustment causes a severe change in the MIRN signal level to which a defect detector, incorrectly, will react. An easy way to deal with this phenomenon is to ignore the defect detector output for a short period of time whenever a laser power adjustment takes place.

FIG. 7 shows properties of a defect signal used for signal mapping. The reference signals for the online classification algorithm represent different classes of disc defects. The classification process for obtaining those different disc defect classes is schematically as follows: collecting defect data signals and preprocess (filtering and remove DC offset), signal mapping (extract a limited set of characteristic properties), clustering (identify groups with similar signal properties), class modeling (classify disc defects by describing signals in each cluster with one descriptive signal).

The signal mapping of the defect data set is as follows. A vector with signal properties as indicated in FIG. 7 is determined, which maps the data signal onto a multi-dimensional property space. The first characteristic property is the mean value ($\mu_y$) 71 of the disc defect signal. This value is particularly useful to distinguish between defects that have a higher and lower reflectivity than the normal disc. For a black dot with a lower reflectivity than the normal disc, the mean value will be below zero while it will be positive for a white dot. The second characteristic parameter is the duration (N) 72 that can be expressed through the number of measured samples when the sample time of the measuring device is known. The third property is the peak value (max |y|) 73 of the disc defect signal. To make a fair comparison between values for all disc defects, the absolute peak value is taken. Otherwise the peak value for a white dot would always be higher than it would be for a black dot. This is undesirable since in the focus is on the different behavior of signals compared to the normal situation. Finally the signal is divided into a fixed number of amplitude bands ($\Delta y$) 74 indicated by dotted lines and count the number of samples that fall within each band. The resulting values for each amplitude band complete the set of characteristic parameters. It is not likely that all these signal properties yield a value in the same order of magnitude. Therefore weighting factors are added to all parameters in order to obtain a balanced set of signal properties.

The processes of clustering and class modeling are well known in the literature. The clustering is based on a set of measurement signals of defects of various kinds, determining the characteristic values thereof resulting in vectors of properties and clustering the vectors of properties by determining mutual distances between these vectors. With the signal mapping presented above L different m-dimensional property vectors $p_r=(f_1(y_r), f_2(y_r), \ldots, f_m(y_r))$, $r=1, 2, \ldots, L$ can be constructed. A clustering method that directly uses the geometric interpretation of similarity is agglomerative hierarchical clustering. The input for this clustering method is a so-called dissimilarity entity-to-entity matrix, where each entity is considered as a single cluster or singleton, denoted by $S_h$, h in H. Note that H is the set of all cluster labels and that each h is uniquely related to one cluster. For an agglomerative hierarchical clustering of L objects, the set H holds 2L−1 labels, where the first L elements correspond to the original entities or singletons. The dissimilarity matrix can easily be derived from the mapped data points by calculating the distance between every pair of objects in the data set. Various definitions for vector distances are available, such as:

Euclidean Distance $$d_{rs}=\sqrt{(p_s-p_r)(p_s-p_r)^T}$$

City Block Distance $$d_{rs} = \sum_{j=1}^{m} |p_{rj} - p_{sj}|$$

and (in a more general notation) Minkowski metric $$d_{rs} = \left\{\sum_{j=1}^{m} |p_{rj} - p_{sj}|^p\right\}^{1/p}$$

The indices r and s denote the labels for the corresponding clusters. The preferred distance measure is the Euclidian distance, usually denoted as $|p_s−p_r|$. With the above distance measures a dissimilarity matrix $D=[d_{rs}]$ with r,s=1, 2, . . . , L, can be constructed. Note that D is symmetric and the elements of its main diagonal are zero. With the dissimilarity matrix available the main steps of the clustering algorithm are as follows.

Step 1 Find the minimal value d(r*,s*), r*≠s* in the dissimilarity matrix, and form the merged cluster $S_h=S_r^* \cup S_s^*$, h∈H.

Step 2 Transform the dissimilarity matrix by substituting one new row (and column) h for the rows and columns r*, s*, with its dissimilarities defined as $$d(r,s)=F(\{S_r\}, \{S_s\}, l_r, l_s)$$

with r,s∈{1, 2, ..., h}∩{r*,s*}'. F is a fixed dissimilarity function and $l_r$, $l_s$ define the number of objects in cluster $S_r$ and $S_s$ respectively. If the number of clusters obtained is larger than 2, go to Step 1, else End.

The function F defines the dissimilarity between the merged clusters. Since these clusters can contain more than one object, the distance measures, as defined above, cannot be used here. Several methods to define the inter-cluster distance or dissimilarity are presented below:

Nearest neighbor (Single linkage) uses the smallest distance between objects in the two clusters $S_r$ and $S_s$.

$$d(r,s)=\min|p_{sj}-p_{ri}|, i\in(1, \ldots, l_r), j\in(1, \ldots l_s)$$

Farthest neighbor (Complete linkage) uses the largest distance between objects in the two clusters.

$$d(r,s)=\max|p_{sj}-p_{ri}|, i\in(1, \ldots, l_r), j\in(1, \ldots l_s)$$

Average linkage uses the average distance between all pairs of objects in the two clusters $S_r$ and $S_s$.

$$d(r,s) = \frac{1}{l_r l_s}\sum_{i=1}^{l_r}\sum_{j=1}^{l_s}\|p_{sj}-p_{ri}\|$$

Centroid linkage uses the distance between the centroids of the two groups $S_r$ and $S_s$.

$$d(r,s)=\|\bar{p}_s-\bar{p}_r\|$$

$$\bar{p}_r = \frac{1}{l_r}\sum_{i=1}^{l_r} p_{ri}$$

$p_s$ is defined similarly.

Ward linkage uses the incremental sum of squares; that is, the increase in the total within-group sum of squares as a result of merging clusters $S_r$ and $S_s$.

$$d(r,s) = l_r l_s \frac{d_c^2(r,s)}{l_r+l_s}$$

where $d_c^2(r, s)$ is the squared distance between clusters $S_r$ and $S_s$ defined in the Centroid linkage. The linkage methods will all give the same or almost the same results, when applied to well-structured data. When the structure of the data is somewhat hidden or complicated, the methods may give quit different results. In the latter case the single and complete linkage methods represent the two extremes of the generally accepted requirement that the 'natural' clusters must be internally cohesive and, simultaneously, isolated from the other clusters. Single linkage clusters are isolated but can have a very complex chained and noncohesive shape. In contrast the complete linkage clusters are very cohesive, but may not be isolated at all. The other three methods result in a trade-off between cohesiveness and isolation of the resulting clusters. The results of the agglomerative hierarchical clustering method can be represented graphically as a hierarchical cluster tree or dendrogram.

FIG. 8 shows a dendrogram, obtained with the agglomerative, hierarchical algorithm From the various options presented above the Euclidean distance measure and Ward linkage method are selected. The Euclidean distance measure is selected since it is easy to calculate and its geometrical interpretation is straightforward. The Ward linkage method is chosen since it provides a good trade-off between cluster cohesiveness and isolation. When compared to similar methods (average and centroid linkage) the Ward linkage appears to result in the most logical clustering based on analysis of the corresponding defect signals and their physical interpretation. In the graph the numbers at the horizontal axis represent the indices of the original singletons and they are called leaf nodes. The connecting horizontal lines, called interior nodes, represent the links between the objects. The heights of the vertical link lines indicate the distance between the linked objects. With this graphical representation of the cluster tree an suitable number of clusters C is determined by drawing a horizontal line 81 in the dendrogram. All the leaf nodes (representing the entities) that are connected below this line belong to one particular cluster. The final result of the clustering process for the set of reference measurements can however contain inconsistencies. An example is the separation of fingerprint signals due to small signal amplitude variations. Choosing an appropriate weighting factor for the duration property can prevent this inconsistency. Another example is the combination of black dots and white dots in the same cluster. Choosing a weighting factor for the mean value property removes this inconsistency.

The result of the clustering is a suitable number of defect classes, which are summarized in the table.

| Cluster | Objects |
| --- | --- |
| $S_1$ | middle black dot 700 μm |
|  | middle black dot 900 μm |
|  | scratch 420–820 μm |
| $S_2$ | middle black dot 1100 μm |
|  | scratch 920–1120 μm |
| $S_3$ | scratch 1320–1520 μm |
| $S_4$ | edge black dot 700–900 μm |
|  | quarter black dot 700–900 μm |
|  | scratch at R = 32 mm |
| $S_5$ | scratch 320 μm |
|  | scratch at R = 32 mm |
|  | scratch at R = 35 mm |
| $S_6$ | all white dots |
| $S_7$ | all fingerprints |

The final step in the procedure is generating a single description, called class model, for each cluster. The problem is to derive a representative signal (or class model) that adequately describes all the signals belonging to one cluster. Inevitably a trade-off must be made between the accuracy of the description for individual signals and its general validity for the whole cluster. A straightforward method for this task is to fit a function to the time series in the cluster that approximates the data according to some criterion. The key issues for this approach are the choice for a general form of the function and the selection of a suitable criterion. A criterion is the sum of the squares of the errors between the fitted function and the data points. Methods using this criterion are usually denoted as least squares (LS) methods. Preferably the function or model structure is based on (physical) laws that relate the signals to the system that generates them. When such a structure is unavailable a more general structure must be used. Examples of such general function structures are the Fourier and Prony decomposition that approximate the data with a sum of sinusoidal or complex exponential functions respectively. Other possibilities are to approximate the data with polynomials or splines. To obtain descriptive signals for each disc defect cluster a least squares polynomial-fitting method is applied. For this purpose a polynomial of a degree n=15 is fitted through the signals of a cluster, which proves to be a sufficient accurate. However, due to the nature of the fitted function, some small oscillations are observed in the resulting signal, which are not present in the original time series. Especially at the edges of the defect signal these deviations can become significant when using the defect class signals for online detection or classification. For that purpose begin and end regions of the signal must be known as accurately as possible. Applying a fitting routine that uses splines could resolve this since splines offer the possibility to impose demands on the slope of the fitted signal in regions where additional accuracy is desired. The class models for each class are mapped to a vector of characteristic values as described above. Finally in the classification unit a distance measure is determined between the vector of characteristic values and vector of characteristic values of a detected anomaly.

FIG. 9 shows the data signal contained in each cluster together with the determined class models. The Figure shows the multivariate 15th order polynomial fits for the clustered disc defect signals. The disc defect signals for six classes ($S_1 \cup S_2$, $S_3$, $S_4$, $S_5$, $S_6$, $S_7$) are shown in thin curves, while the fitted class models are shown as thick lines.

FIG. 10 shows a defect detection and classification unit. At an input 91, samples of a scanning signal to be monitored are entered, for example the MIRN signal as indicated above. In a filter unit 92, for example a finite impulse response (FIR), a mean value for a monitoring period of the signal is calculated. The monitoring period is selected to provide an early warning at an acceptable rate of false alarms. An implementation of the filter unit 92 is given above in FIG. 5. Said period mean value (called FIRu) is provided to a threshold detector 93 which is detecting an anomaly by comparing the mean value to a detection threshold for producing an anomaly detection signal (called defo). The anomaly detection signal is coupled to the various characteristic value units for starting the classification process. A mean value unit 94 calculates the first characteristic value for the total defect. The unit receives the mean value of the first period prior to detection (FIRu), already determined in unit 92) as starting value $u_0$. A duration unit 95 calculates the second characteristic value of the detected defect by counting the samples. A maximum value unit 96 calculates the third characteristic value of the defect during the defect. A signal memory 97 maintains the previous samples of the scanning signal for the monitoring period, which are available to maximum value unit 96 for determining a starting value for said maximum. An amplitude distribution unit 98 calculates the remaining characteristic values of the signal during the defect, also receiving the previous samples from the signal memory 97. The output of the distribution unit 98 are characteristic values for 11 signal value bands called bin0, bin1, ... bin10. In a multiplexer unit 99 all characteristic value are combined to a vector describing the current detected defect. In an Euclidean distance unit 100 the distance to the predetermined class model vectors is calculated. The output for each class is provided to a final multiplexer unit 101 that feeds the resulting vector into the class determination unit 102. This unit indicates which class has the smallest distance and hence provides the classification.

FIG. 11 shows a classification process. Vertically a determined distance value is given and horizontally the number of sample, i.e. the actual time, is given. Detection occurs around sample 80, and curves marked $S_1 \cup S_2$, $S_3$, $S_4$, $S_5$, $S_6$ and $S_7$ indicate the distance calculations for the respective classes. It can be seen that the curve $S_4$ indicates a small distance, whereas the other class curves indicate larger distances. Around sample 120 a decision can be made that the defect belongs to class $S_4$.

Although the invention has been mainly explained by embodiments using optical disc data storages, the invention is also suitable for other record carriers such as rectangular optical cards, magnetic discs or any other type of servo controlled system that requires tracking or position control of an element. It is noted, that in this document the word 'comprising' does not exclude the presence of other elements or steps than those listed and the word 'a' or 'an' preceding an element does not exclude the presence of a plurality of such elements, that any reference signs do not limit the scope of the claims, that the invention may be implemented by means of both hardware and software, and that several 'means' or 'units' may be represented by the same item of hardware or software. Further, the scope of the invention is not limited to the embodiments, and the invention lies in each and every novel feature or combination of features described above.

The invention claimed is:

1. Device for scanning a track on a record carrier, the device comprising
   a head for scanning the track,
   a front-end unit coupled to the head for generating at least one scanning signal, and a detection unit for detecting anomalies in the scanning signal,
   the detection unit being arranged for calculating a mean value of the scanning signal and comparing the mean value to a threshold for providing an anomaly detection signal.

2. Device as claimed in claim 1, wherein the detection unit is arranged for calculating said mean value for a predetermined interval, in particular by summing a predetermined number of samples of the scanning signal.

3. Device as claimed in claim 1, wherein the front-end unit comprises means for generating as the scanning signal a mirror signal indicative of the amount of radiation from a radiation beam reflected via the track, in particular by combining signals from a multitude of detector segments.

4. Device as claimed in claim 1, wherein the device comprises a servo unit for controlling the position of the head or scanning elements of the head in dependence of the scanning signal, and for adjusting said controlling in dependence of the anomaly detection signal, in particular for interrupting the scanning signal during an anomaly.

5. Device as claimed in claim 4, wherein the servo unit is arranged for adjusting said controlling also in dependence of the classification result, in particular for resuming the controlling in dependence of the scanning signal during an anomaly of a less disturbing type.

6. Device as claimed in claim 1, wherein the detection unit comprises classification means for generating a classification result of a detected anomaly by identifying the detected anomaly among a plurality of predetermined anomaly classes by comparing the scanning signal with a plurality of reference signals corresponding to said plurality of predetermined anomaly classes.

7. Device as claimed in claim 6, wherein the classification means are arranged for determining at least one characteristic value of the scanning signal during the anomaly and comparing the at least one characteristic value to corresponding characteristic values of the plurality of predetermined anomaly classes.

8. Device as claimed in claim 6, wherein the classification means are arranged for calculating a distance in a multidimensional space, in particular calculating an Euclidean distance, for said comparing of characteristic values.

9. Device as claimed in claim 6, wherein the classification means are arranged for determining as characteristic values at least one of the following: a mean value, a duration, a peak value, a distribution of sample values of the scanning signal in a predetermined number of amplitude bands.

10. Device as claimed in claim 6, wherein the classification means are arranged for generating the classification result at a classification time substantially after the anomaly detection signal indicates an anomaly.

11. Device as claimed in claim 6, wherein the classification means are arranged for generating the classification result as soon as said comparison for one of the anomaly classes indicates a difference that is larger than the difference values for the remaining anomaly classes by at least a predefined threshold.

12. Method of scanning a track on a record carrier, the method comprising scanning the track, generating at least one scanning signal, calculating a mean value of the scanning signal, and comparing the mean value to a threshold for providing an anomaly detection signal.

* * * * *